United States Patent [19]
Chika et al.

[11] Patent Number: 5,201,955
[45] Date of Patent: Apr. 13, 1993

[54] ANNULAR GRADIENT OPTICAL LENS TINT SYSTEM

[76] Inventors: Hani E. Chika, 4521 Park Blvd., San Diego, Calif. 92116; Tariq J. Elias, 7358 Margerum Ave., San Diego, Calif. 92120

[21] Appl. No.: 667,175

[22] Filed: Mar. 11, 1991

[51] Int. Cl.$^5$ .............................................. B05C 3/09
[52] U.S. Cl. .................................. 118/416; 118/425; 118/503; 134/157
[58] Field of Search ............... 118/416, 503, 52, 53, 118/425; 134/76, 149, 157; 279/66; 269/254 CS

[56] References Cited

U.S. PATENT DOCUMENTS

| | | | |
|---|---|---|---|
| 243,107 | 6/1881 | Conger | 118/503 |
| 1,281,762 | 10/1918 | Carpenter | 118/503 |
| 1,404,309 | 1/1924 | McDonald | 118/416 |
| 2,824,029 | 2/1958 | Zinty | 118/53 |
| 4,317,427 | 3/1982 | Turner | 118/503 |
| 4,915,986 | 4/1990 | Elias et al. | 118/705 |

FOREIGN PATENT DOCUMENTS

| | | | |
|---|---|---|---|
| 2821192 | 11/1979 | Fed. Rep. of Germany | 118/416 |
| 273023 | 11/1989 | German Democratic Rep. | 269/254 CS |
| 231736 | 7/1944 | Switzerland | 269/254 CS |
| 2208322 | 3/1989 | United Kingdom | 118/503 |

Primary Examiner—W. Gary Jones
Assistant Examiner—Todd J. Burns
Attorney, Agent, or Firm—Ralph S. Branscomb

[57] ABSTRACT

A system is provided for tinting eyeglass lenses wherein the lenses are engaged in a frame which is both vertically reciprocated and simultaneously rotated about on an axis central to and orthogonal to the plane of the lens so that an annular gradient tint is produced darker at the outside edges of each lens and becoming progressively lighter toward the center, with the optical center of the lens either being completely clear or substantially lighter than the rest of the lens.

7 Claims, 2 Drawing Sheets

ANNULAR GRADIENT OPTICAL LENS TINT SYSTEM

BACKGROUND OF THE INVENTION

Gradient tint eyeglass lenses have been around for a long time. They are produced by dipping plastic lenses into a vat of hot tinting solution such that the upper portions of the lens spend more time in the dye than the lower portions. A state-of-the-art machine to do this was patented on Apr. 10, 1990, U.S. Pat. No. 4,915,986 by the inventors of the instant disclosure. That machine was called An Optical Lens Tinting Machine. Although that machine can and should be used with the invention of the present disclosure, it would be possible to use few other machines that produce gradient tints with the present invention, although the result would probably not be of the same quality.

The idea of the gradient tint is to permit the user to see the lower field of vision in full light while excluding some of the upper rays which would generally be considered as glare. In addition to reducing eye strain, gradient tint glasses can actually increase visibility by causing the iris to expand due to the upper shading, permitting more light to enter from the field of vision, which is often a roadway, a landscape, or even a book or computer.

Despite the benefits of the standard gradient tint, there is still a lot of glare that enters the eye in many situations, causing eye fatigue and unnecessary eye strain. This is particularly true during visual activities which are carried on much more in modern times than during the evolutionary development of the eye. For example, when watching television, reading a book, and especially when using a computer, it is only the light from a small cone of the observed field that is useful. The light from around this field of vision does not contribute to the proper viewing. For example, when using a computer, there are often bright fluorescent lights overhead or there may be daylight streaming in through a picture window. This light causes visually impairing refractions and reflections in the eye, and also reduces the aperture of the iris so that less light overall is admitted. This means that the computer will tend to look dim, while surrounding light areas are undesirably bright.

This is a principal well known to even amateur photographers, who know that the light readings on their light meters cannot be trusted when photographing a relatively dark subject with a bright background, or vice versa. Of course the eye cannot do this. It is miraculous that the eye can adjust as enormously as it does to varieties of light and dark, without expecting it to somehow diminish peripheral light from undesirable sources and amplify incoming light from the field of vision to accommodate the various visual activities of mankind. There is a need therefore, for a lens tinting system which will produce glasses which accomplish this function which is beyond the capability of the eye itself.

SUMMARY OF THE INVENTION

The instant invention fulfills the above-stated need by providing a system for creating an eyeglass lens gradient that is dark in a continuous accurate band around the edges, not just the top, and becoming lighter toward the center, permitting full or almost full entry of light from the central field of vision, while excluding damaging and distracting peripheral light.

The apparatus that accomplishes this is a lens engaging and rotating system on which a pair of lenses are mounted and caused to rotate simultaneously as they are reciprocated in and out of the lens tinting solution. Spring-loaded lens clips permit each lens to be grasped such that it may be centered with the optical center at the center of rotation regardless of the general misalignment of the geometrical center and optical center of the lens.

The lens engaging and rotating mechanism do not themselves vertically reciprocate the lenses, at least not in the preferred embodiment. The above-cited patent provides a very sophisticated and highly controlled system for reciprocation, and it is intended that the instant invention be used with the invention disclosed in that patent for the optimum in smooth gradient tinting and ease of operation.

DETAILED DESCRIPTION OF THE PREFERRED EMBODIMENT

Figure 1:
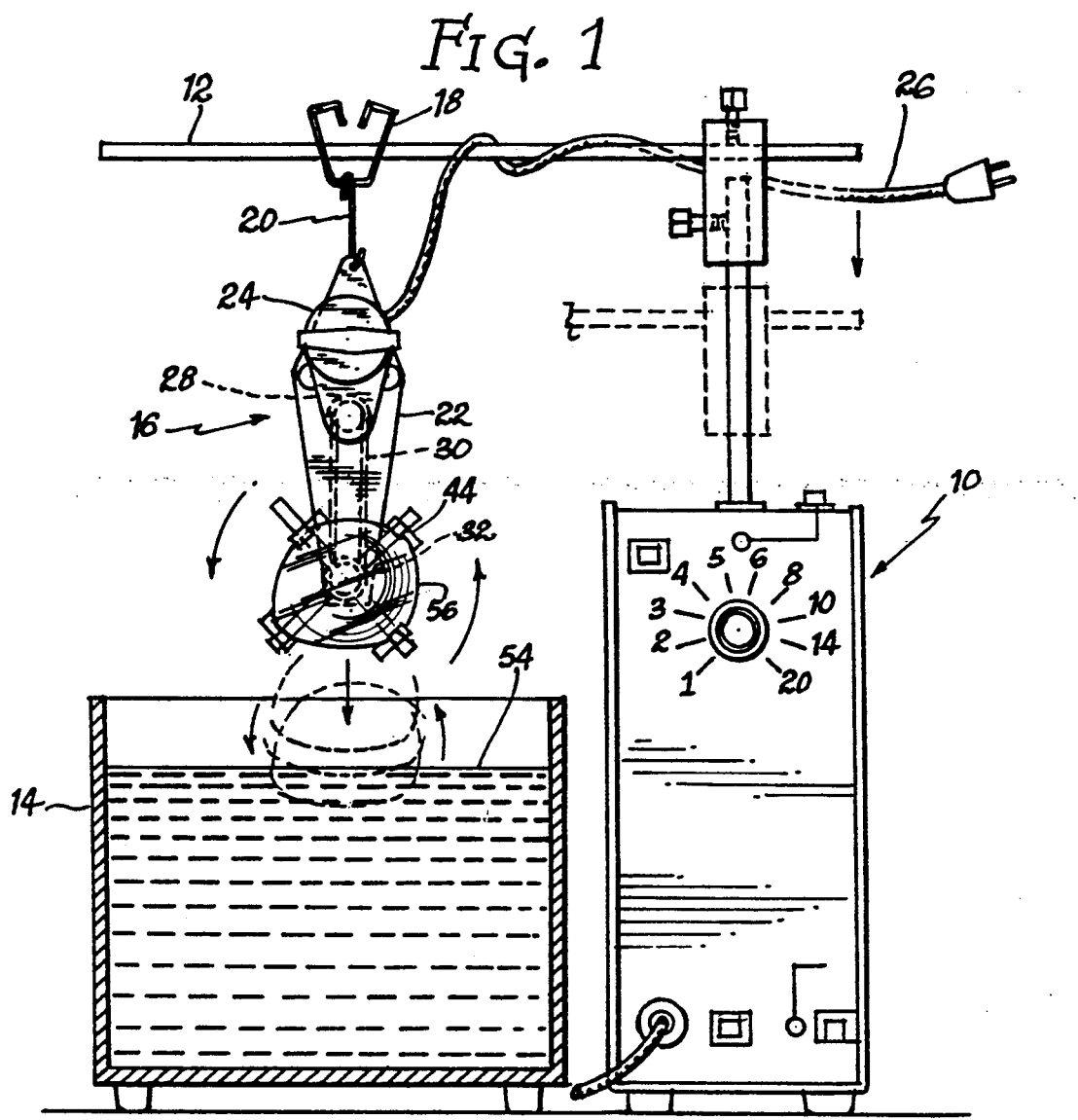
FIG. 1 is a side elevation view of the invention illustrating the Applicants' vertical reciprocation machine in use with the lens gripper and rotater.

FIG. 1 illustrates at 10 an optical lens tinting machine as disclosed and patented in U.S. Pat. No. 4,915,986, issued Apr. 10, 1990. That machine, currently the state of the art in normal lens gradient tint production, utilizes a sophisticated microprocessor-controlled stepping motor to carefully control the vertical oscillations of the boom 12 which supports a lens holding rack. This machine is characterised not only by its precise control of the dipping process so that no streaks are produced in the lens, but also by its ease of use. It is the ideal machine for use with the invention, but other machines which produced a reciprocation with a substantial vertical component would work.

A vat of dye 14 is also shown in FIG. 1. The lens engaging and rotating apparatus is indicated at 16. It attaches to the boom 12 by means of a squeeze clip 18 that permits the apparatus 16 to slide back and forth on the boom when the tops are squeezed together, allowing it to be very quickly repositioned on the boom, or removed from the boom altogether. A hook 20 suspends a main frame panel 22 from the clip 18. This panel mounts a small motor and gear reduction box inside the combined housing 24. The motor is an AC motor in the preferred embodiment as evidenced by the cord 26 in FIG. 1. Obviously there are a number of small motors, AC or DC, that could be made to work with various combinations of gearing. The drive pulley 28 extends from the opposite side of the motor housing and drives a belt 30 which rotates driven pulley 32 fixedly mounted on a transverse shaft 34 journaled in bushings 36 in a bracket 38 formed in the bottom of the frame panel 22.

Mounted on the shaft 34, on either side, are clamps 40, which are identical to one another. Each clamp has two crossbars non-rotationally retained on the shaft by nuts 42 threaded onto the shaft, and defines a pair of radial arms. On each radial arm is mounted a detent 44 having a lens-retaining notch 46 and a square passageway 48. The arm passes through the passageway and the clip which is frictionally retained on the respective arm by means of a coil spring 50 which is tension-adjustable by means of the set screw 52.

In this fashion, the detents can quickly and easily be slid inward or outward axially to capture lenses of various size and shapes at four points. Because the lightest-colored part of the lens, after tinting, will be aligned with the shaft 34, and because all of the detents will slide in and out at will, it is a simple matter to position the optical center of the lens at the axis of the axel so that it will become the clear, or at least the lightest, spot of the lens. The optical center spot that is substantially untinted is subject to some dimensional variance, but would be on the order of a centimeter.

Although the apparatus is shown being driven by a motor removed from the lens clamps and driving them through a pulley, clearly a motor could be disposed immediately between the clamps and directly drive the lens clamps, although obviously this would subject the motor to periodic contact with the dye liquid and therefore would be less than optimal.

In operation, when using the Phantom gradient machine model 85a indicated at 10, the boom 12 is lowered until the bottom of the lenses touches the upper surface 54 of the vat in the dye. The cycle reference push button is then pushed, and a red LED will come on. This sets the reference line for the tinting cycle. Then the lens is lowered using an up/down switch which is part of the tinting machine to any depth desired provided that the optical center of the lens is never submerged. Then, removing the finger from the up/down switch will automatically start the gradient cycle. The cycle time is set to any time desired, depending on the density of the tint desired, before the tinting cycle starts.

The motor ordinarily makes a continuous rotation to evenly distribute dye around the center of the lens as an increasingly dense gradient. However, clearly a programmable motor could be used with a simple program to rotate the motor back and forth so that only an arcuate swath at the top of the lens is tinted, or so that the entire circumferential arc is tinted, but the top could be tinted more deeply than the bottom.

Figure 2:
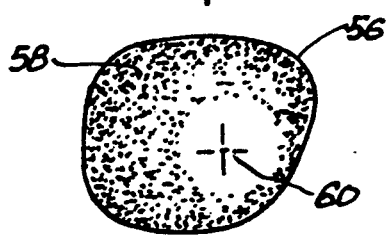
FIG. 2 illustrates a lens having the annular gradient pattern produced by the tinting system.
Figure 3:
FIG. 3 illustrates the manner in which light is excluded by peripheral portions of the lens and admitted by the central portion around the optical access.
Figure 3:
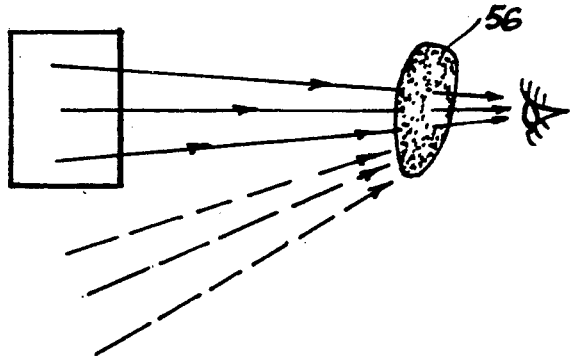
Figure 4:
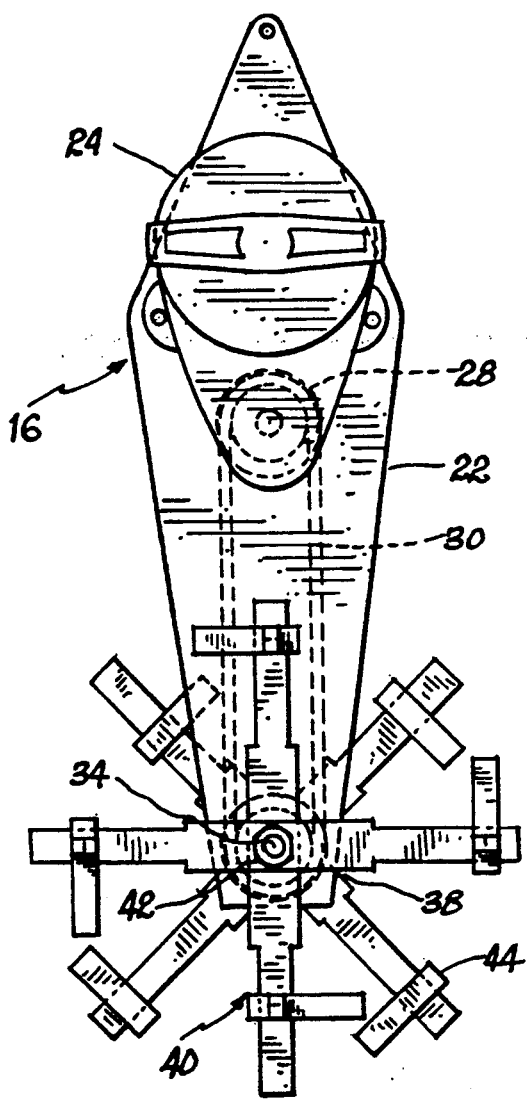
FIG. 4 is a front elevation view of the actual lens engaging and reciprocating apparatus.
Figure 5:
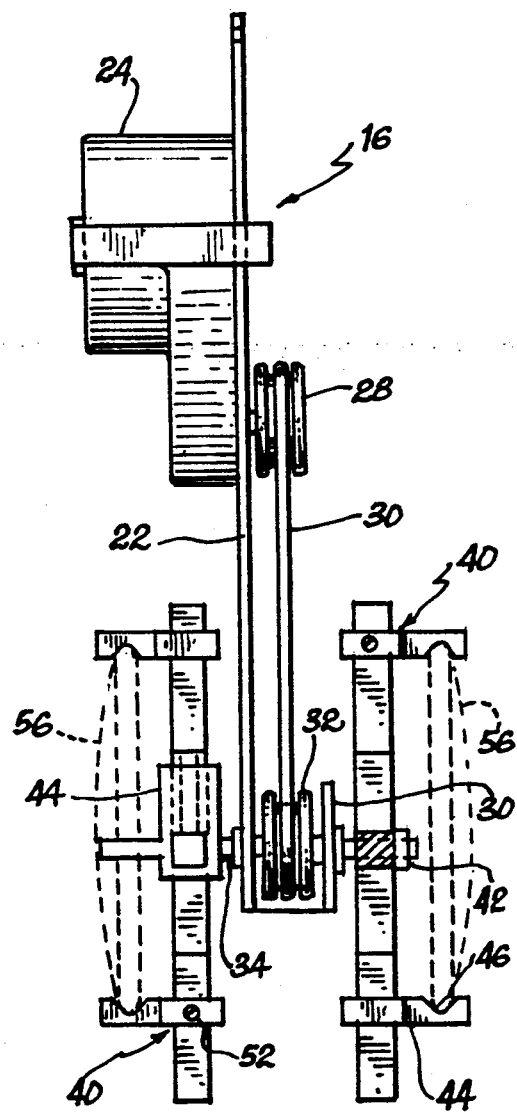
FIG. 5 is a side elevation view from the right side of FIG. 4.
Figure 6:
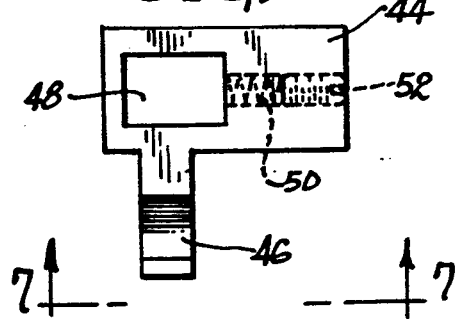
FIG. 6 is a detail illustrating the adjustable detents on the rotary arms which actually hold the lens.
Figure 7:
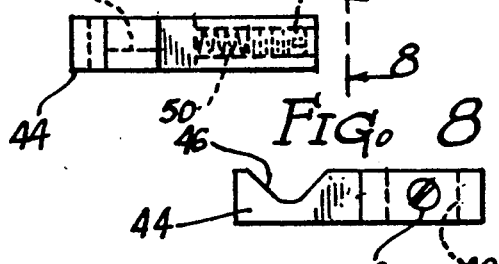
FIG. 7 is a view taken from line 7—7 of FIG. 6.
Figure 8:
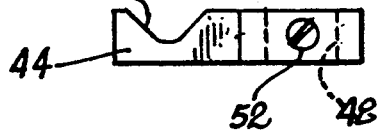
FIG. 8 is a view taken along line 8—8 of FIG. 7.

In any event, in the preferred manner of operating the apparatus, lenses 56, shown in FIGS. 2 and 3, will have a tint 58 around the optical center 60, allowing the optimal amount of light to pass through the center of the lens, and reducing annoying outside sources such as the light bulb illustrated in FIG. 3. Actual tests using the lens prove that especially when using a computer, longer periods of use can be endured with less eye strain than with either non-tinted lenses, or lenses with a standard gradient tint.

It is hereby claimed:

1. An optical tinting apparatus for tinting at lens which substantially defines a lens plane, said apparatus comprising:

(a) a lens engaging and rotating means for gripping said lens;
    (b) said lens engaging and rotating means including means for rotating said lens in said lens plane;
    (c) reciprocating means including a vertically reciprocating substantially horizontally extended boom having said lens engaging and rotating means attached thereto for imparting a motion having a vertical component to said lens such that said lens can be vertically reciprocated and rotated in lens tinting solution to produce a tint in the lens which is both graduated and arcuate.

2. Apparatus according to claim 1 wherein said lens engaging and rotating means has an adjustable spring clip slidably adjustable along said boom by which said reciprocating means is releasably attached to said lens engaging and rotating means.

3. Apparatus according to claim 1 wherein said lens engaging and rotating means includes a clamp for engaging said lens, said clamp comprising a plurality of radial arms each having a lens detent slidably engaged on the respective arm and having a spring clip to releasably engage the respective arm at a selected position along the length of the respective arm.

4. Apparatus according to claim 3 wherein said radial arms define the rotational center of said clamp, and said lens engaging and rotating means includes a motor, a belt driven by said motor, and a driven shaft coaxial with said rotating center for rotating said lens in said lens plane, said driven shaft having mounted thereon a pulley driven by said by said belt.

5. Apparatus according to claim 4 wherein said lens engaging and rotating means is physically separable from said reciprocating means and said motor is an electrically powered motor powered independently from said reciprocating means to rotate said lens in said lens plane.

6. An optical lens tinting apparatus for tinting a lens substantially defining a lens plane, which apparatus is connectable to a reciprocating member having a vertically reciprocating horizontal boom for dipping said lens at least partially in and out of a vat of tinting solution, said apparatus comprising:

(a) a lens engaging and rotating means for engaging and permitting continuous 360 degree rotation of a lens about an axis substantially perpendicular to said lens plane;
    (b) releasable suspension means for suspending said lens engaging and rotating means from said reciprocating member;
    (c) said lens engaging and rotating means comprising a rotational clamp for clamping said lens which rotates about said axis substantially perpendicular to said lens plane;
    (d) motor means for rotating said clamp;
    (e) said lens having an optical center and said clamp defining a plurality of adjustable detent elements for engaging the edges of said lens and being rotational about an axis substantially coincident with the optical center of said lens; and,
    (f) said lens engaging and rotating means comprising two separately adjustable coaxial clamp for simultaneously tinting both lenses of a pair of eye glasses.

7. Apparatus according to claim 6 wherein said two clamps are mounted on a driven shaft with a pulley thereon which is belt-driven by said motor means.

* * * * *